Figure 1:
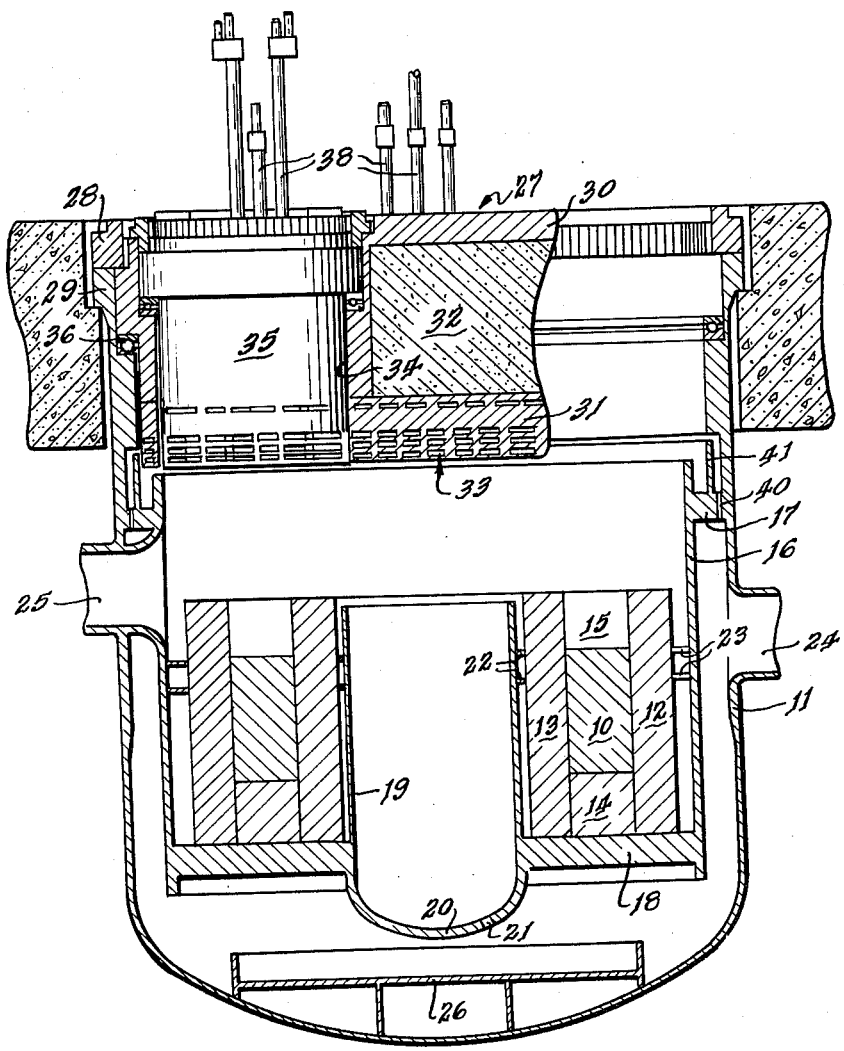

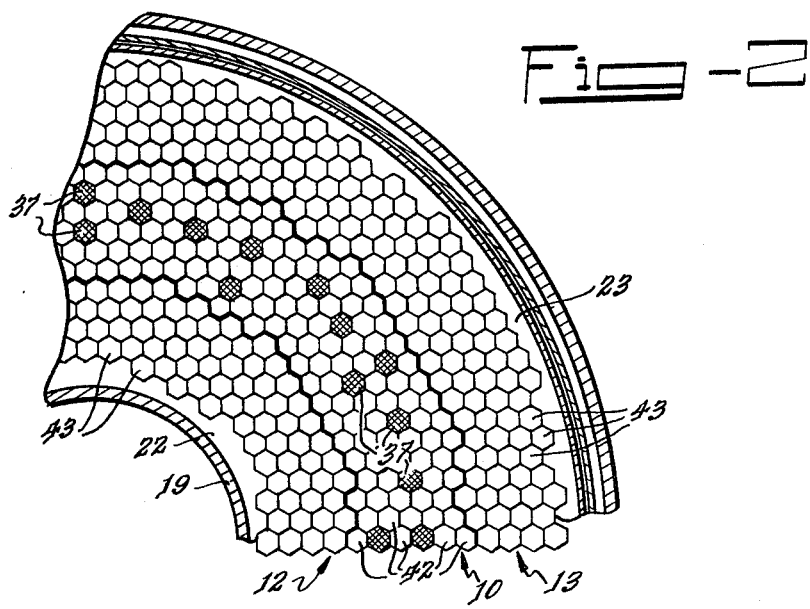
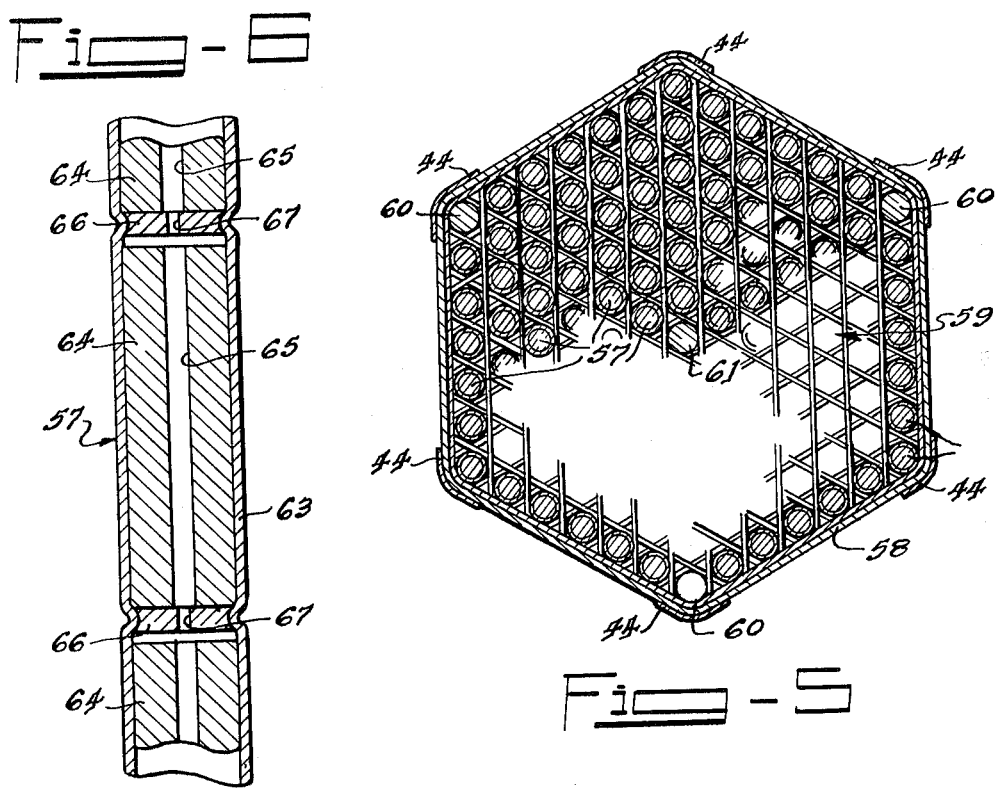

July 12, 1966   W. H. JENS ET AL   3,260,649
NUCLEAR REACTOR
Filed May 28, 1964   4 Sheets-Sheet 4
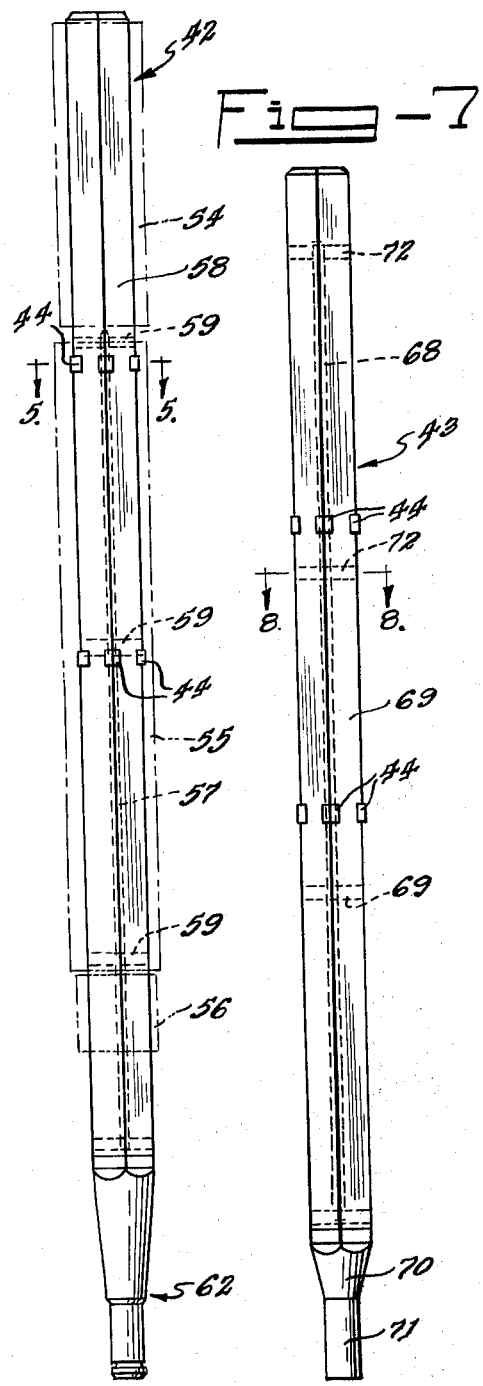
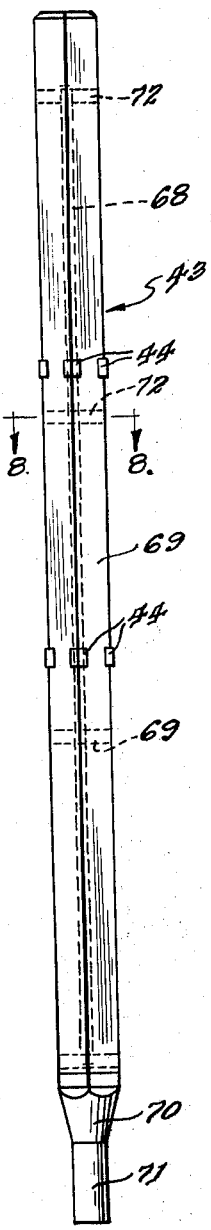
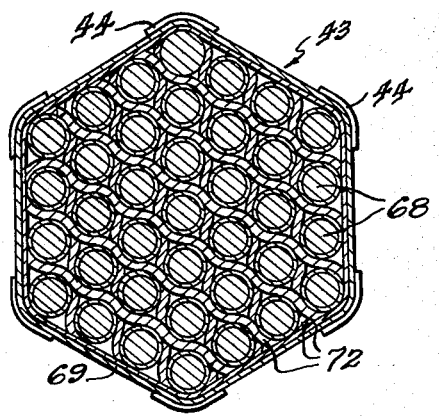

United States Patent Office 3,260,649
Patented July 12, 1966

3,260,649
NUCLEAR REACTOR
Wayne H. Jens, Grosse Pointe, Mich., Milton C. Edlund and Howard S. Barringer, Lynchburg, Va., John K. Davidson and Charles E. Klotz, Silver Spring, Md., John B. Nims, Royal Oak, Mich., Richard S. Miller, Brookfield, Wis., and Ronald G. Palmer, Idaho Falls, Idaho, assignors to the United States of America as represented by the United States Atomic Energy Commission
Filed May 28, 1964, Ser. No. 371,163
4 Claims. (Cl. 176—18)

The invention described herein was made in the course of, or under, a contract with the United States Atomic Energy Commission.

This invention relates to a nuclear reactor. In more detail, the invention relates to a type of very large fast power-breeder nuclear reactor which if desired can be designed so that loss of coolant from any coolant channel results in a decrease in reactivity.

Relatively small reactors inherently have a negative coolant void coefficient and lose reactivity on loss of coolant. A hazard which makes the design of very large fast reactors difficult results from the positive coolant void coefficient inherent in many such reactor designs; in such reactors reactivity would increase with loss of coolant.

A reactor having a large positive void coefficient cannot be considered entirely practical because void formation can cause a very large reactivity effect, and formation of voids is a very real possibility due to boiling of the coolant. Once boiling starts in a coolant channel, the channel is very rapidly voided because of the inherent low pressure of the coolant system and the high specific volume ratio of the coolant vapor and coolant liquid. Thus voiding within a channel can result in a large reactivity insertion and potentially can result in a large-scale energy release. Therefore, the containment required for a reactor having a large positive void coefficient would be prohibitively expensive.

The reason that large reactors may have a positive coolant void coefficient whereas small reactors have a negative coolant void coefficient is that the effect observed is the resultant of two contradictory effects. When a fast reactor loses coolant, increased neutron leakage decreases the reactivity of the reactor. Also, however, hardening of the neutron energy spectrum (increase in average energy of the neutrons present in the core) increases the reactivity. In a small reactor there is a net decrease in reactivity because loss of reactivity due to increased neutron leakage predominates. Such a reactor has a negative coolant void coefficient.

As core size increases, neutron leakage becomes relatively of less importance until at some size, dependent on the material composition of the reactor core, the increase in reactivity due to hardening of the neutron spectrum predominates and the reactor has a positive coolant void coefficient.

Any fast reactor which has a positive coolant void coefficient can be constructed as taught herein to drastically reduce the coefficient. The invention finds utility in light-metal cooled, plutonium-239-fueled reactors having a core size of over about 800 liters. In reactors incorporating uranium-235 as fuel the invention is of importance only as applied to somewhat larger reactors, while it finds application only to much larger heavy-metal-cooled reactors.

It will be appreciated that it is only in very large reactors that the invention is of importance. However, the future of atomic energy appears to reside in large fast breeder reactors for it is only in such reactors that uranium reserves can be fully utilized economically.

The invention will be described hereinafter specifically with respect to a sodium-cooled, plutonium-239-fueled reactor developing about 2500 megawatts (Th) of power and having a core volume of about 7800 liters.

In any practical design of a 2500 megawatt (Th) sodium-cooled reactor, it is not possible to have a negative sodium void coefficient at every position in the reactor. Since boiling at any location in a coolant channel leads rapidly to voiding of a large fraction of the channel, it probably is sufficient if voiding of any complete channel produces a negative or zero reactivity effect and positive void effects that occur only locally are acceptable.

Since the positive reactivity effect of sodium removal is due primarily to absorption and spectral changes, varying one or more of the following parameters might result in a decreased coolant void coefficient:

(1) Sodium volume fraction
(2) Coolant composition
(3) Fuel material composition
(4) Core length to diameter ratio
(5) Beryllium moderator volume fraction
(6) Annular blanket regions within the core
(7) Reflector regions on core boundaries On analysis it becomes evident that leakage effects are most beneficial in reducing the coolant-void coefficient. Other variations have undesirable effects on the coefficient or result in an intolerably low breeding radio. Thus a high leakage core is indicated. High leakage is obtained from a core in the form of a cruciform but such a core is not economical on space and requires a very large pressure vessel. Also high leakage is obtained from a core having a high diameter to height ratio; however, such an expedient strongly increases both fuel and capital costs and very strong local positive effects would still be present.

It is accordingly the object of the present invention to develop a very large fast reactor which can be operated with safety.

It is a more detailed object of the present invention to develop a 2500 megawatt (Th) sodium-cooled plutonium-239-fueled fast reactor which loses reactivity on loss of coolant from any coolant channel.

It is a still more detailed object of the present invention to develop a large sodium-cooled fast reactor having a low sodium void coefficient, high breeding ratio, reasonable doubling time, long core life, low fuel cycle cost and high reactor outlet sodium temperature.

These and other objects of the present invention are attained in a sodium-cooled nuclear reactor incorporating an annular core and having an annular sodium reflector immediately above the core and communicating with the coolant channels. As a result of leakage from the annular core, the coolant void coefficient is small although still positive. Since the upper axial reflector is in communication with the coolant channels, loss of sodium from the coolant channels also results in loss of sodium from the reflector resulting in a net negative reactivity effect on the core. Also according to the present design voiding of any coolant channel results in a net negative effect on reactivity.

Figure 3:
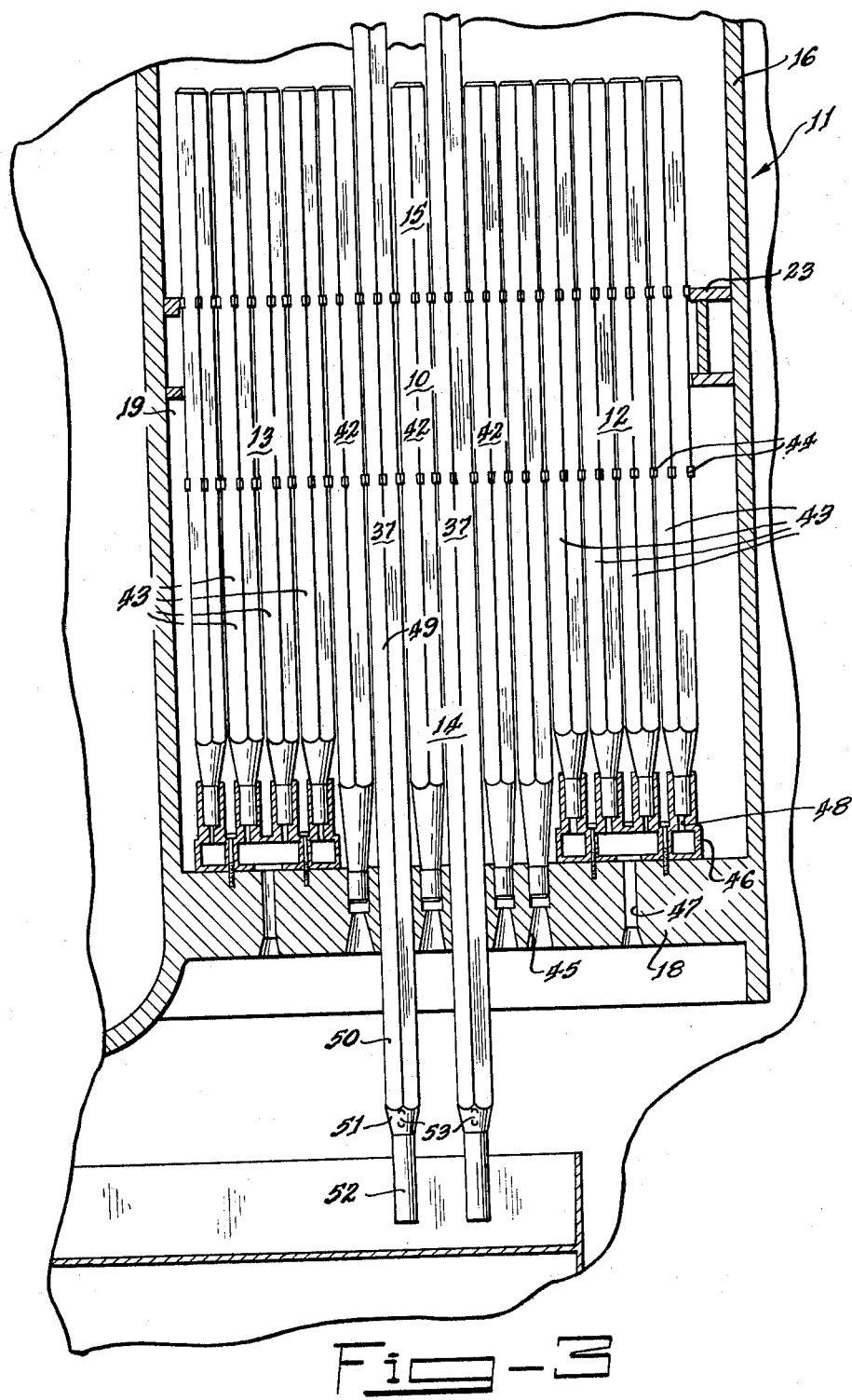

The invention will next be described in connection with the accompanying drawing wherein:

FIG. 1 is a diagrammatic vertical sectional view of a nuclear reactor, with a portion of the top plug broken away, constructed in accordance with the present invention, FIG. 2 is an enlarged partial horizontal cross section taken through the reactor core, FIG. 3 is a still further enlarged partial vertical cross section taken through the reactor core, FIG. 4 is a vertical elevation of a fuel assembly, showing a single fuel pin in phantom, FIG. 5 is an enlarged horizontal cross section taken on the line 5—5 in FIG. 4, FIG. 6 is an enlarged partial vertical section of a fuel pin, FIG. 7 is a vertical elevation of a blanket assembly, showing a single blanket pin in phantom, and FIG. 8 is an enlarged horizontal section taken on the line 8—8 in FIG. 7.

Referring now to FIG. 1 of the drawing a nuclear reactor according to the present invention comprises an annular core 10 enclosed within a pressure vessel 11. Core 10 is surrounded radially by an annular outer blanket 12 and encloses an annular inner blanket 13. A lower axial blanket 14 is disposed below annular core 10 and a reflector 15 is disposed above the core. Reflector 15 is formed of the material used to cool the reactor and is so constructed that it inherently is avoided when coolant is lost from the reactor.

An inner cylindrical shell 16 extending substantially above the top of the core is spaced from pressure vessel 11 and supported therefrom near its top by internal support ring 17. An annular grid plate 18 is supported by cylindrical shell 16 near its lower end and in turn supports the reactor core and associated blankets. An inner core support cylinder 19 having a convex bottom 20 with coolant apertures 21 therein is attached to the inner edge of annular grid plate 18. Inner and outer plates 22 and 23 provide lateral support for the core. The center of cylinder 19 is occupied by instrumentation thimbles (not shown).

One or more inlet nozzles 24 penetrate pressure vessel 11 above the centerline of the reactor core and one or more outlet nozzles 25 in inner shell 16 also penetrate pressure vessel 11 at the same level. Inner cylindrical shell 16 thus serves as a baffle separating inlet coolant from outlet coolant. Also shown at the bottom of pressure vessel 11 is a core meltdown pan 26 which will hold the entire core in noncritical configuration if it melts into the pan.

A top shield plug 27 of the same diameter as the pressure vessel is held down by a bolting ring 28 which is attached to a flange 29 at the top of pressure vessel 11. Top shield plug 27 consists of a welded shell including integral top and bottom plates 30 and 31, respectively. Bottom plate 31 is the vessel closure head. The interior of the shell is filled with pellet and/or powder type shielding 32. Beneath bottom plate 31 is a laminated layer of gas filled thermal baffles 33 which shield plug 27 from high-temperature coolant.

Top plug 27 contains an off-center access port 34 provided with an inner shield plug 35 constructed the same as shield plug 27. Top plug 27 may be rotated on bearings 36 to index access port 34 over any desired fuel or blanket assembly thus providing direct overhead access to the entire core and blanket. When top plug 27 is to be rotated, control assemblies 37 (see FIG. 2) are driven in as far as they will go and then control rod drives 38 are disconnected and withdrawn into the top of top plug 27.

Two further features designed to insulate portions of the pressure vessel from hot outlet coolant will also be described by reference to FIG. 1. In the first place, an annular gas-filled gap above the top of the maximum coolant level is filled with argon gas by means not shown. This gap insulates the upper portion of pressure vessel 11 from all heat input except at its juncture with internal support ring 17. Also apertures 40 in internal support ring 17 permit by-pass coolant to flow over baffle 41 thereby preventing high-temperature outlet coolant from coming in contact with the pressure vessel.

Referring next to FIGS. 2 and 3, core 10 includes a plurality of elongated hexagonal fuel assemblies 42, while inner and outer blankets 12 and 13 each include a plurality of elongated hexagonal blanket assemblies 43. Spacer pads 44 are disposed around these fuel and blanket assemblies so that the inner blanket, the core, and the outer blanket are held rigidly between the inner and outer lateral support plates 22 and 23 at operating temperature.

Fuel assemblies 42 are supported by annual grid plate 18, each assembly mating with an inlet orifice 45 in grid plate 18. Each fuel assembly 42 is orificed individually by permanently placed, hard-surfaced inlet restrictions in grid plate 18.

Blanket assemblies 43 are supported by distribution headers 46 each of which feed coolant entering the headers from holes 47 in grid plate 18 to a group of blanket assemblies 43. Distribution headers 46 are removable and contain orifices 48 designed to pass the proper amount of coolant to each assembly. The coolant flow to the fuel and blanket assemblies is orificed to keep the reactor exit temperature at 1200° F. without unduly penalizing the assemblies located at the radial flux peaks.

Control and safety assemblies 37 are not shown in detail, as they are relatively conventional in nature. They include a hexagonal guide tube 49 extending upward to approximately the same height as the fuel assemblies 42, the guide tube 49 having a cylindrical extension 50 which penetrates grid plate 18 and contains a conical transition piece 51 and a nose piece 52. Coolant inlet orifices 53 are located in the transition piece 51.

A fuel assembly 42 is shown in more detail in FIGS. 4, 5 and 6. The fuel assembly includes a reflector portion 54 at the top thereof, a fuel portion 55 extending a major part of the length of the assembly, and a short blanket portion 56 below the fuel portion. Fuel assemblies 42 contain a hexagonal bundle of fuel pins 57 disposed within a hexagonal can 58 which are rigidly positioned and supported by a plurality of spacer grids 59 and three tie rods 60 bearing spacer sleeves (not shown) located at alternate corners of the hexagonal bundle. A rod 61 at the center is used for actuating a back-up mechanical hold-down latch (not shown).

Inlet nozzle 62 to fuel assembly 42 is specially designed to eliminate the necessity for mechanical hold-down means located above the core. As shown, the cross-sectional area of the inlet portion of this nozzle is less than the cross-sectional area of the fuel assembly, which reduces the hold-down force required to the point where the assembly 42 is held down by its own weight.

Fuel pins 57 consist of a stainless steel outer tube 63 which encloses a plurality of aligned fuel pellets 64 having axial openings 65 therein and a plurality of blanket pellets (not shown) at the bottom of the fuel pin also having an axial opening therein. Axial opening 65 accommodates fission gas and allows for volume change in case of melt-down during severe transients. The fuel and blanket pellets do not extend to the bottom of tube 63 but stop short to leave a gas reservoir. The gas reservoir and axial openings provide sufficient space to accommodate the large volume of fission gas obtained from a high burnup fuel.

Tungsten segmenting discs 66 having an opening 67 at the center thereof are fixed within tube 63 to separate fuel pellets 64 and prevent possible accidents. Ceramic fuel elements may not have a prompt negative feedback due to thermal expansion of the fuel under certain conditions as does a metallic fuel. Thermal cycling may produce horizontal cracks within the ceramic material. In subsequent heating of the fuel it would then be possible for the fuel to move in a random fashion, which would permit the expansion effect to be nonreproducible and in some cases positive. The presence of the cracks also causes concern for the possibility of fuel slumping and rapid reactivity changes. Both of these effects are minimized by the construction described.

As has been made evident heretofore, the sodium reflector region 54 above the core forms a very important part of the present invention. This region is obtained by extending the hexagonal can 58 above the top of the fuel pins 57. Thus a layer of coolant extends above the top of the core 10 to form reflector 15.

As shown in FIGS. 7 and 8, blanket assemblies 43 contain a hexagonal bundle of blanket pins 68 disposed within a hexagonal support can 69. A transition piece 70 and support nozzle 71 is located at the lower end of the support can. The bundle of blanket pins 68 is positioned on a triangular pitch by four equispaced spacer grids 72. Because the power level and plutonium content of the blanket elements are low, any effects of fuel slumping are negligible and no segmenting discs are necessary.

The reactor includes an annular core four feet high and two feet thick having a core volume of 7830 liters. At the bottom of the core is a six-inch thick axial blanket and at the top of the core is an 18-inch thick axial sodium reflector. The inner and outer diameters of the core are covered by 18-inch thick radial blankets. The reactor develops 2500 megawatts (Th) with a breeding ratio of 1.32 and a core life of 836 days.

The design employs a combination of a thin annulus, which makes the effect of sodium voiding in the core small although slightly positive (in this design), and a sodium reflector above the core, which makes the effect of channel voiding zero or negative even for inherently troublesome central channels. Loss of sodium from the entire core causes a calculated reactivity increase of about 30 cents; when voiding of the reflector is considered, the effect is a reactivity decrease of 2.8 dollars. Loss from the core alone, of the coolant in the channels occupying the central third of the core, causes a reactivity increase of about 1.5 dollars. Reflector voiding reduces this to a negligible reactivity effect. In contradistinction a large volume cylindrical reactor developing about the same power would have a reactivity increase of over $10 on voiding the core of coolant.

Voiding of the core could occur either as a result of flow stoppage or boiling of the coolant. An accident which leads to boiling at the top of the core is not to be expected, but is possible. In such a case voiding in the reflector occurs more extensively than in the core and the resulting net reactivity effect is negative. If boiling were to start at the axial center of the core, voiding of the reflector might not be rapid enough to produce a net negative reactivity effect. However, other means are available to compensate for such an accident.

In addition to the advantage of a low sodium void coefficient, the following are other advantages of the annular design:

(1) The breeding ratio is 1.32 and the doubling time is, therefore, about 15 years based on a 100 percent plant factor. This breeding ratio and doubling time are better than in a cylindrical design of similar composition, because of the increased leakage to the radial blanket, where breeding can be done efficiently.

(2) The initial loading uncertainty is smaller for the annular core because of the relatively high edge fuel worth. Thus a reasonable uncertainty of 5 percent in the estimated reactivity would have a corresponding uncertaintly of 36 percent in the critical loading of the cylindrical core and of 17 percent in the annular core.

(3) The annular design gives an excellent peak-to-average power distribution. This distribution enables a high average core power output for the selected thermal criteria and helps to overcome the higher critical mass resulting from the increased leakage of the annular design.

The mechanical design of the core is basically simple with resultant low cost of major structural components, ease of remote fuel refabrication, and ease of fuel handling. Mechanisms, other than the control assembly cylindrical extensions, that could freeze or jam have been completely eliminated from the reactor during operation. No upper hold-down structure is needed because of the hydraulic design of the fuel assembly, and a parallel upflow is used in the core and blanket to free the top of the reactor of a structure which could interfere with refueling.

The following table gives the more important reactor parameters.

| | |
|---|---|
| Reactor output, thermal, mw: | |
| Core [1] | 2125 |
| Inner radial blanket [1] | 185 |
| Outer radial blanket [1] | 190 |
| Total | 2500 |
| Reactor size, ft.: | |
| Core— | |
| Height | 4 |
| Mean outside diameter | 13 |
| Mean inside diameter | 9 |
| Inner radial blanket— | |
| Height | 6 |
| Mean outside diameter | 9 |
| Mean inside diameter | 6 |
| Outer radial blanket— | |
| Height | 6 |
| Mean outside diameter | 16 |
| Mean inside diameter | 13 |
| Axial blanket— | |
| Height | 0.5 |
| Mean outside diameter | 13 |
| Mean inside diameter | 9 |
| Core volume _____liters__ | 7830 |
| Composition, v./o.: | |
| Core and axial blanket— | |
| Fuel and void | 29.4 |
| Sodium | 40.0 |
| Structure and cladding | 30.6 |
| Inner and outer radial blanket— | |
| Fuel and void | 55 |
| Sodium | 30 |
| Structure and cladding | 15 |
| Nuclear data: | |
| Critical mass (Pu-239+Pu-241), kg. | 2910 |
| (U-238+Pu-240)/(Pu-239+Pu-241) | 4.57 |
| Breeding ratio— | |
| Core | 0.52 |
| Radial blanket | 0.76 |
| Axial blanket | 0.04 |
| Total | 1.32 |
| Median fission energy, kev. | 190 |
| Mean neutron lifetime, sec. | $4.1 \times 10^{-7}$ |
| Fissile Pu destruction rate (core), kg./full power year | 1040 |
| Fissile Pu production rate (total), kg./full power year | 1370 |
| Doubling time, years, 100% load factor | 14.7 |
| Fuel life, full power days | 836 |
| Control assemblies— | |
| Safety, number | 12 |
| Total worth, percent $\Delta k./k.$ | 2.4 |
| Temperature override and regulating, number | 6 |
| Total worth, percent $\Delta k./k.$ | 1.2 |
| Fuel depletion, number | 30 |
| Total worth, percent $\Delta k./k.$ | 6 |
| Absorber material, 90% dense | $B_4C$ |
| Core performance: | |
| Power density, kw./l. | 282 |
| Specific power, kw./kg. Pu | 733 |
| Average linear heat generation, kw./ft. | 8.6 |
| Power distribution— | |
| $(P_{max}/P_{av})$ axial | 1.29 |
| $(P_{max}/P_{av})$ radial | 1.18 |
| $P_{max}/P_{av}$ | 1.52 |
| Core fuel dimensions: | |
| Fuel assemblies, number | 498 |
| Pins per assembly, number | 123 |
| Width of hexagonal assembly (flats), in. | 4.45 |
| Pin outside diameter, in. | 0.300 |
| Length of pin, ft.— | |
| Core fuel portion | 4.0 |
| Axial blanket portion | 0.5 |
| Fission gas reservoir | 0.5 |
| Total | 5.0 |

Core fuel dimensions—Continued
- Interassembly spacing, in. — 0.050
- Pellet material, mixture—
  - 20.8% enriched — $PuO_2$–$UO_2$
- Pellet density, percent of theoretical — 95
- Cladding material — S.S. 316
- Cladding thickness, in. — 0.028
- Sodium flow (assembly at flux peak), lb./hr. — $2.158 \times 10^5$
- Pressure drop through pins (assembly at flux peak), p.s.i. — 36.5

Radial blanket fuel dimensions:
- Blanket assemblies, No.—
  - Inner radial blanket — 276
  - Outer radial blanket — 582
  - Total — 858
- Pins per assembly, No. — 37
- Width of hexagonal assembly, in. — 4.45
- Pin outside diameter, in. — 0.607
- Length of pins, ft. — 6
- Pellet material—.3% enriched — $UO_2$
- Pellet density, percent of theoretical — 95
- Cladding thickness, in. — 0.015
- Cladding material — S.S. 316
- Sodium flow (assembly at flux peak of inner blanket), lb./hr. — $6.9 \times 10^4$
- Pressure drop through pins (assembly at flux peak of inner blanket), p.s.i. — 6.5

Primary system:
- Total coolant flow rate lb./hr — $1.14 \times 10^5$
  (Including 5% by-pass flow)
  g.p.m — $2.8 \times 10^5$
- Over-all coolant temperature rise, °F. — 250
- Coolant temperature rise through core, °F. — 263
- Coolant temperature rise through radial blanket, °F. — 263
- Coolant inlet temperature, °F. — 950
- Over-all core pressure drop, p.s.i. — app. 45
- Coolant loops, No. — 6
- Primary heat exchangers, No. — 6
- Primary pumps, No. — 6
- Material of primary system — S.S. 316
- Reactor vessel—
  - Outside diameter, ft. — 20
  - Over-all height, ft. — 25
  - Material — S.S. 316

[1] At midpoint of equilibrium fuel cycle.

It will be appreciated that the dimensions and core composition specified above are not necessarily optimum. For example, the voiding characteristics of the core can be further improved by decreasing the thickness of the core annulus and the dimensions of the blanket annular regions can be changed to improve the breeding characteristics of the reactor. In addition, although this particular design requires an enrichment of 20.8%, changing the core composition (volume fractions of fuel, structure and coolant) may be desirable to optimize the economics and would therefore change the required enrichment.

In conclusion it may be stated that:

(1) The reactor described herein has a low sodium-void coefficient and therefore is self-regulating for such common situations as control rod withdrawal and loss of flow without control rod insertion.

(2) The low sodium-void coefficient prevents abnormally large insertions of reactivity during unusual but credible accidents that cause boiling or other sodium voids in the core.

(3) The annular core configuration, in spite of its central hole, has not penalized the design but has improved it.

(4) Fuel cycle costs are low.

(5) High burnup inherent in the ceramic oxide fuel and the ability to control large amounts of excess reactivity with a relatively small number of control assemblies and good neutron economy result in the ability to operate for long periods without refueling, thus providing for high plant availability.

It will be understood that the invention is not to be limited to the details given herein but that it may be modified within the scope of the appended claims.

The embodiments of the invention in which an exclusive property or privilege is claimed are defined as follows:

1. A liquid-metal-cooled, fast breeder, nuclear power reactor having a core volume in excess of 800 liters comprising an annular core having longitudinal coolant channels therein, means for passing coolant upwardly through the coolant channels, a reflector composed of coolant material disposed above the annular core in communication with the coolant channels, an annular blanket below the annular core, an annular blanket surrounding the annular core, and an annular blanket enclosed by the annular core.

2. A liquid-metal-cooled fast breeder nuclear power reactor having a cover volume in excess of 800 liters comprising a plurality of elongated, vertically disposed fuel assemblies arranged in an annulus, said fuel assemblies including a reflector portion at the top thereof, a fuel portion extending a major portion of the length of the assemblies, and a short blanket portion below the fuel portion, the core volume being that portion of the reactor occupied by the fuel portion of the fuel assemblies, said fuel assemblies consisting of a can and a bundle of slender, elongated fuel pins enclosed within the can, said can extending above the top of the fuel pins, the major part of said fuel pins containing fissionable material to form said fuel portion, the lower part of said fuel pins containing fertile material to form said blanket portion, and means for passing a coolant upwardly through the fuel assemblies, that part of the coolant in the cans above the top of the fuel pins forming the reflector portion of the fuel assemblies.

3. A liquid-metal-cooled, fast, power-breeder nuclear reactor comprising an annular core having a height of four feet, a mean outside diameter of 13 feet, and a mean inside diameter of nine feet, a 1½-foot-wide annular blank surrounding the anular core, a 1½-foot-wide annular blanket enclosed by the annular core, a six-inch axial blanket disposed below the annular core, a 18-inch axial reflector disposed above the annular core, and means for passing liquid metal upwardly through the axial blanket, annular core, and axial reflector, the reflecting characteristics of said axial reflector being dependent on the continued flow of coolant therethrough, whereby voiding of the annular core inherently voids the axial reflector.

4. A sodium-cooled fast power-breeder nuclear reactor comprising a plurality of vertically disposed hexagonal fuel assemblies arranged in an annulus, said annulus having a mean outside diameter of 13 feet and a mean inside diameter of nine feet, a plurality of vertically disposed hexagonal blanket assemblies arranged around the fuel assemblies in a 1½-foot-wide annulus, a plurality of vertically disposed hexagonal blanket assemblies arranged inside of the fuel assemblies in a 1½-foot-wide annulus, said fuel assemblies including an 18-inch reflector portion at the top thereof, a four-foot fuel portion, and a six-inch blanket portion below the fuel portion, said fuel assemblies consisting of a hexagonal can and a hexagonal bundle of slender, elongated fuel pins enclosed within the hexagonal can, said can extending 18 inches above the top of the fuel pins to define the said reflector portion, said fuel pins containing 20.8% enriched plutonium dioxide-uranium dioxide mixture to form the said fuel portion of the fuel assemblies and 0.3% enriched uranium dioxide to form the said blanket portion of the fuel assemblies and means for passing liquid sodium upwardly through the fuel assemblies, that part of the sodium in the hexagonal cans above the top of the fuel pins forming the axial reflector.

References Cited by the Examiner

UNITED STATES PATENTS

| | | | |
|---|---|---|---|
| 2,975,117 | 3/1961 | Zinn | 176—40 X |
| 3,140,235 | 7/1964 | Hatch et al. | 176—40 X |
| 3,165,447 | 1/1965 | Stephenson | 176—40 X |

REUBEN EPSTEIN, *Primary Examiner.*